US012046856B2

(12) United States Patent
Fischer et al.

(10) Patent No.: US 12,046,856 B2
(45) Date of Patent: Jul. 23, 2024

(54) ELECTRICAL PLUG DEVICE WITH A BLOCKING MECHANISM FOR A POSITION ASSURANCE ELEMENT WHICH CAN BE RELEASED BY A MATING HOUSING

(71) Applicant: TE Connectivity Germany GmbH, Bensheim (DE)

(72) Inventors: Carsten Fischer, Bensheim (DE); Carlo L'Abbate, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 306 days.

(21) Appl. No.: 17/547,684

(22) Filed: Dec. 10, 2021

(65) Prior Publication Data

US 2022/0190520 A1 Jun. 16, 2022

(30) Foreign Application Priority Data

Dec. 10, 2020 (DE) ......................... 102020132994.6

(51) Int. Cl.
*H01R 13/629* (2006.01)
*H01R 13/639* (2006.01)

(52) U.S. Cl.
CPC . *H01R 13/62938* (2013.01); *H01R 13/62955* (2013.01); *H01R 13/639* (2013.01)

(58) Field of Classification Search
CPC .................... H01R 13/62938; H01R 13/62955
(Continued)

(56) References Cited

U.S. PATENT DOCUMENTS 7,175,451 B2 * 2/2007 Shuey .................. H01R 13/641 439/157
7,438,570 B2 * 10/2008 Mori ................ H01R 13/62933 439/157
(Continued)

FOREIGN PATENT DOCUMENTS

CN 102474047 A 5/2012
CN 109638564 A 4/2019
(Continued)

OTHER PUBLICATIONS

Chinese First Office Action dated Jun. 14, 2023, with English translation thereof, corresponding to Application No. 202111492367.6, 24 pages.
(Continued)

*Primary Examiner* — Neil Abrams
(74) *Attorney, Agent, or Firm* — Barley Snyder

(57) ABSTRACT

An electrical plug device includes a connector housing pluggable with a mating housing, a connection aid engageable with the mating housing, a position assurance element held at the connector housing and displaceable from an open position to a securing position, and a blocking mechanism. The connection aid is movable from a plugging position to a holding position. The connector housing in the plugging position is connectable to the mating housing. The mating housing in the holding position is held at the connector housing. The connection aid in the open position is movable from the plugging position to the holding position and in the securing position is fixated in the holding position. The blocking mechanism blocks the position assurance element in the open position and has a release element with which the blocking mechanism is released in a state of the connector housing and the mating housing being plugged together.

20 Claims, 9 Drawing Sheets

(58) Field of Classification Search
USPC .......................................................... 539/157
See application file for complete search history.

(56) References Cited

U.S. PATENT DOCUMENTS

| | | | | |
|---|---|---|---|---|
| 8,662,906 | B2 | 3/2014 | Schmitt et al. | |
| 9,130,324 | B2 * | 9/2015 | Furuya | H01R 24/005 |
| 10,297,945 | B2 | 5/2019 | Yamane | |
| 2004/0192090 | A1 * | 9/2004 | Flowers | H01R 13/639 439/157 |
| 2015/0295352 | A1 | 10/2015 | Kim et al. | |
| 2021/0281006 | A1 | 9/2021 | Spataru et al. | |
| 2022/0166165 | A1 * | 5/2022 | Dobernig | H01R 13/641 |
| 2022/0190520 | A1 * | 6/2022 | Fischer | H01R 13/62944 |
| 2024/0039211 | A1 * | 2/2024 | Boemmel | H01R 13/62955 |

FOREIGN PATENT DOCUMENTS

| | | | |
|---|---|---|---|
| CN | 209823007 | U | 12/2019 |
| CN | 210156622 | U | 3/2020 |
| DE | 102007026582 | B3 | 11/2014 |
| DE | 202014105369 | U1 | 11/2014 |
| DE | 102014220893 | A1 | 4/2016 |
| DE | 102020202727 | A1 | 9/2021 |
| EP | 2863490 | B1 | 12/2017 |
| EP | 3007283 | B1 | 12/2018 |
| EP | 3477787 | A1 | 5/2019 |
| EP | 3694058 | A1 | 8/2020 |
| WO | 2013092174 | A1 | 6/2013 |

OTHER PUBLICATIONS

Extended European Search Report dated May 4, 2022 corresponding to Application No. 21213452.2-1201, 8 pages.
Indian Search Report dated Jun. 22, 2022 thereof corresponding to Application No. 202144056691, 7 pages.
Office Action from the Japanese Patent Office dated Dec. 6, 2022 , corresponding to Application No. 2021-198211 with English translation, 8 pages.
German Office Action, App No. 102020132994.6, dated Nov. 11, 2021, 6 pages.

* cited by examiner

ELECTRICAL PLUG DEVICE WITH A BLOCKING MECHANISM FOR A POSITION ASSURANCE ELEMENT WHICH CAN BE RELEASED BY A MATING HOUSING

CROSS-REFERENCE TO RELATED APPLICATIONS

This application claims the benefit of the filing date under 35 U.S.C. § 119(a)-(d) of German Patent Application No. 102020132994.6, filed on Dec. 10, 2020.

FIELD OF THE INVENTION

The present invention relates to an electrical plug device and, more particularly, to an electrical plug device with a blocking mechanism.

BACKGROUND

Electrical plug devices for electrical plug connections, in particular connectors or sockets, are known. An electrical plug device generally comprises a connector housing for receiving at least one electrical contact element. The connector housing is plugged together with a mating housing of a mating connector configured to be complementary. In a state when plugged together, an electrical contact element of the plug device can be electrically connected to an electrical contact element of the mating connector.

In order to facilitate a plug device being plugged to a mating connector and also to secure the plug device against unintentional release of the plug connection when plugged together with the mating connector, connection aids that form a drive device for the plugging motion are often provided and can hold the mating housing at the connector housing. In order to secure such a connection aid in a holding position in which the mating housing is held at the connector housing, position assurance elements can be used with which the connection aid in a securing position of the position assurance element is fixed in the holding position.

The known devices are indeed useful to hold the connector and mating connector together. In particular with high-voltage connections, for example, in electrical systems of electric vehicles, it is additionally necessary to prevent the plug device and the mating connector from being plugged together incompletely or improperly. In addition, it is desirable, in particular in the high-voltage sector, to provide plug devices with which a sealed connection between the connector housing and the mating housing is possible.

SUMMARY

An electrical plug device includes a connector housing pluggable with a mating housing, a connection aid engageable with the mating housing, a position assurance element held at the connector housing and displaceable from an open position to a securing position, and a blocking mechanism. The connection aid is movable from a plugging position to a holding position. The connector housing in the plugging position is connectable to the mating housing. The mating housing in the holding position is held at the connector housing. The connection aid in the open position is movable from the plugging position to the holding position and in the securing position is fixated in the holding position. The blocking mechanism blocks the position assurance element in the open position and has a release element with which the blocking mechanism is released in a state of the connector housing and the mating housing being plugged together.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
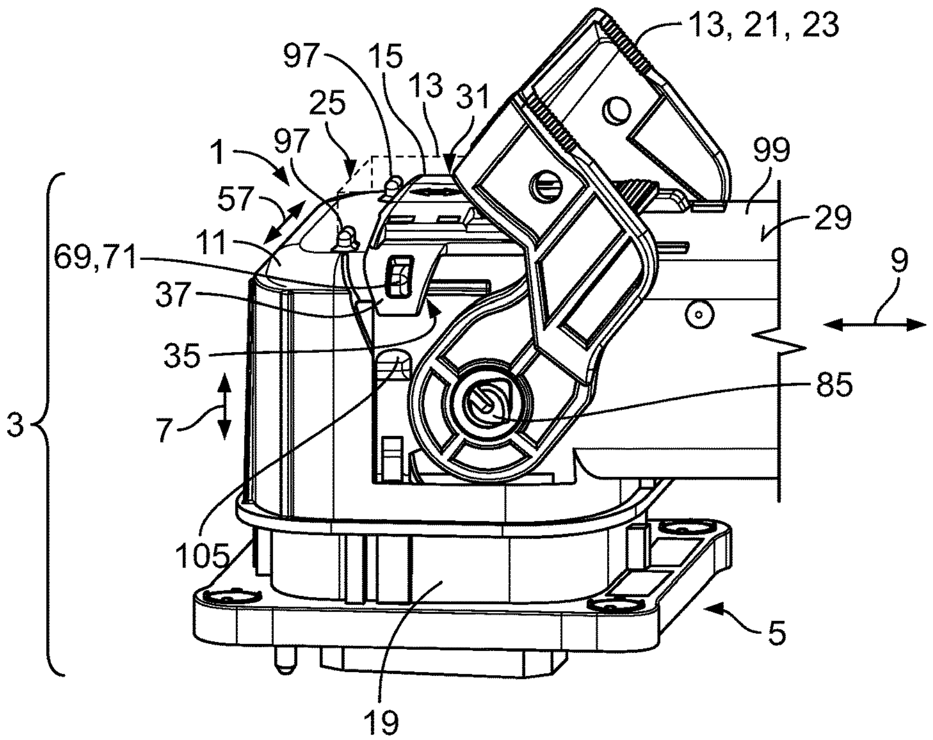
FIG. 1 is a perspective view of an electrical plug device for a 90° plug connection while being plugged together.

The invention shall be explained hereafter in more detail by way of example using embodiments with reference to the drawings. The feature combinations illustrated in the embodiments by way of example can be supplemented by further features according to the explanations herein, in accordance with the properties of the electrical plug device of the invention that are required for a specific application. Individual features can also be omitted in the embodiments described if the effect of this feature is irrelevant for a specific case of application. The same reference numerals in the drawings are used for elements having the same function and/or the same structure.

A first embodiment of electrical plug device 1 according to the invention and an assembly according to the invention for establishing an electrical plug connection 3 comprising plug device 1 shall first be discussed with reference to FIGS. 1 to 5. The mode of operation shall thereafter be explained with reference to FIGS. 6 to 11.

Electrical plug device 1, hereinafter plug device 1, is used to establish an electrical plug connection to a mating connector 5. In the embodiment shown, plug device 1 and mating connector 5 are used to establish a so-called 90° plug connection, i.e., a plugging direction 7 runs perpendicular to a lead direction 9 along which an electrical lead of plug device 1 extends.

Figure 7:
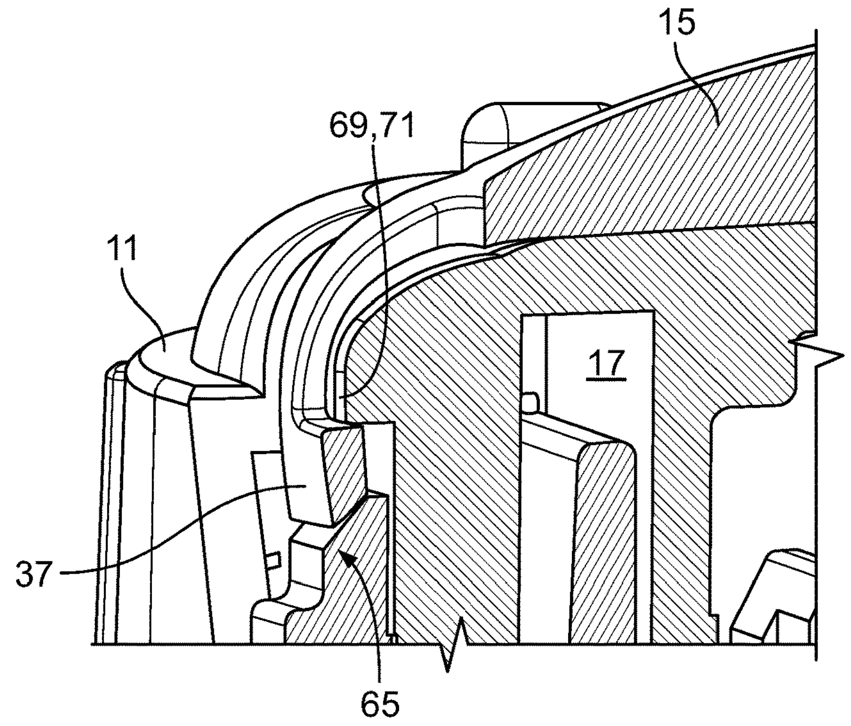
FIG. 7 is a sectional perspective view of the electrical plug device in the state of FIG. 6.

Plug device 1, shown in FIG. 1, which can be in particular a connector, comprises a connector housing 11, a connection aid 13, and a position assurance element 15. Plug device 1 can alternatively also be a socket. Connector housing 11 is used to receive at least one electrical contact element which can be arranged in particular in an interior space 17 of connector housing 11. Interior space 17 is indicated in FIG. 7. Connector housing 11 is configured to be plugged together with a mating housing 19 of the mating connector, which has a mating contact element configured to electrically connect with the contact element in the connector housing 11. Connector housing 11 and mating housing 19 are, in an embodiment, configured in such a way that they can be plugged together along plugging direction 7.

Plug device 1 comprises connection aid 13, shown in FIG. 1, to facilitate plugging the connector housing 11 and the mating housing 19 together. Connection aid 13 forms a drive device 21 for the plugging motion and is configured as a lever 23 held to be rotatable at connector housing 11. Connection aid 13 can be made to engage with mating housing 19, in order to draw mating housing 19 towards connector housing 11 and to hold mating housing 19 on connector housing 11. For this purpose, connection aid 13 can be moved from a plugging position 25 to a holding position 27, wherein connector housing 11 in plugging position 25 is connectable to mating housing 19 and mating housing 19 in holding position 27 is held at connector housing 11.

Plugging position 25 is indicated in FIG. 1, where part of connection aid 13 is shown in dashed lines. FIG. 1 shows connection aid 13 in a position between plugging position 25 and holding position 27. Holding position 27 is shown in FIGS. 8 to 11. Position assurance element 15 is used to fixate connection aid 13 in holding position 27 at connector housing 11. Position assurance element 15 is held to be displaceable on an outer side 29 of connector housing 11 but is held in a captive manner at the connector housing 11.

Figure 10:
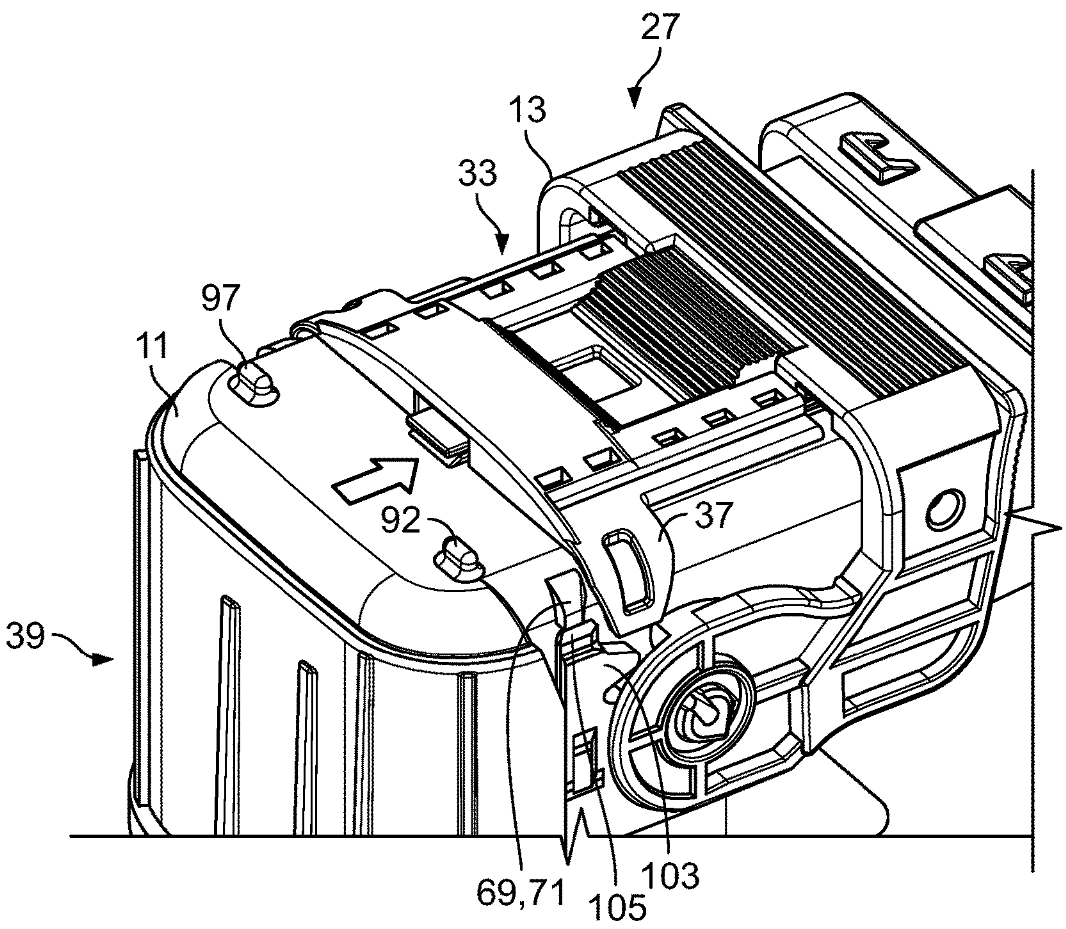
FIG. 10 is a perspective view of the electrical plug device in a next step, in which the position assurance element is moved to a securing position.
Figure 11:
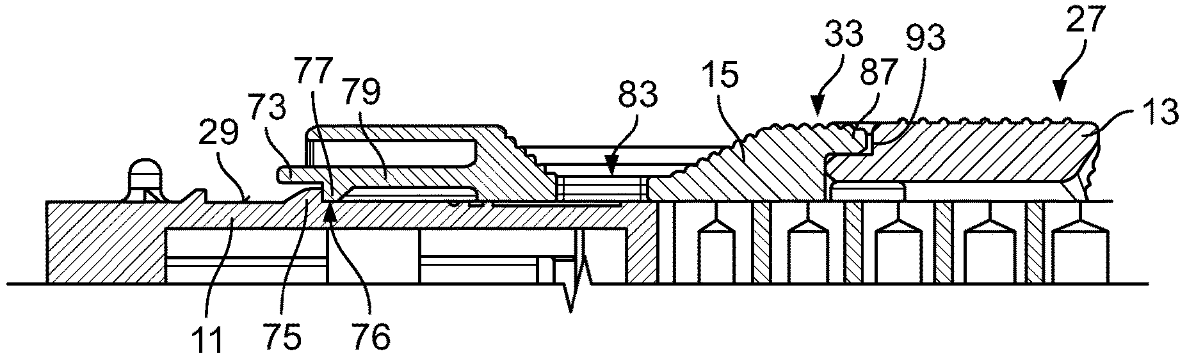
FIG. 11 is a sectional side view of the electrical plug device in the state of FIG. 10.
Figure 12:
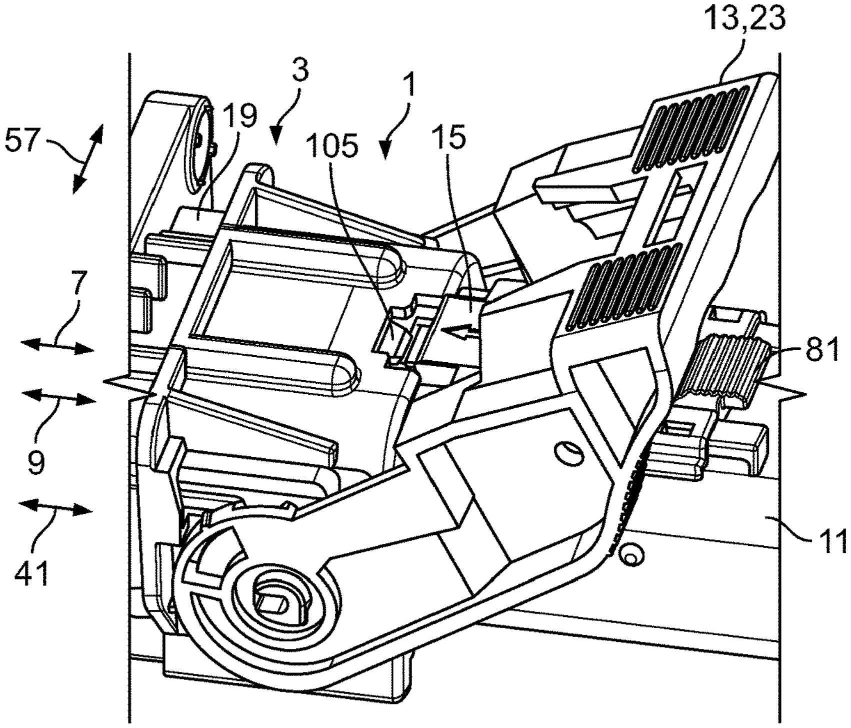
FIG. 12 is a perspective view of an electrical plug device according to another embodiment.

Position assurance element 15 can be displaced from an open position 31, shown in FIG. 1, to a securing position 33, shown in FIGS. 10 and 11. Connection aid 13 in open position 31 can be moved from plugging position 25 to holding position 27, i.e. is not prevented from moving. In securing position 33, however, connection aid 13 is fixated in holding position 27 at connector housing 11.

In the plugging position 25 of the connector housing 11, the connector housing 11 is open at least in sections for the connection to the mating housing 19 or, in other words, accessible to or ready to receive the mating housing 19. The connection aid 13 is configured such that it holds the mating housing 19 at the connector housing 11 in the holding position 27 when the mating housing 19 in a final position is arranged relative to the connector housing 11. With a motion of the connection aid 13, the mating housing 19 can be drawn into the connector housing 11, at least in sections, or pushed thereover depending on the configuration.

Figure 4:
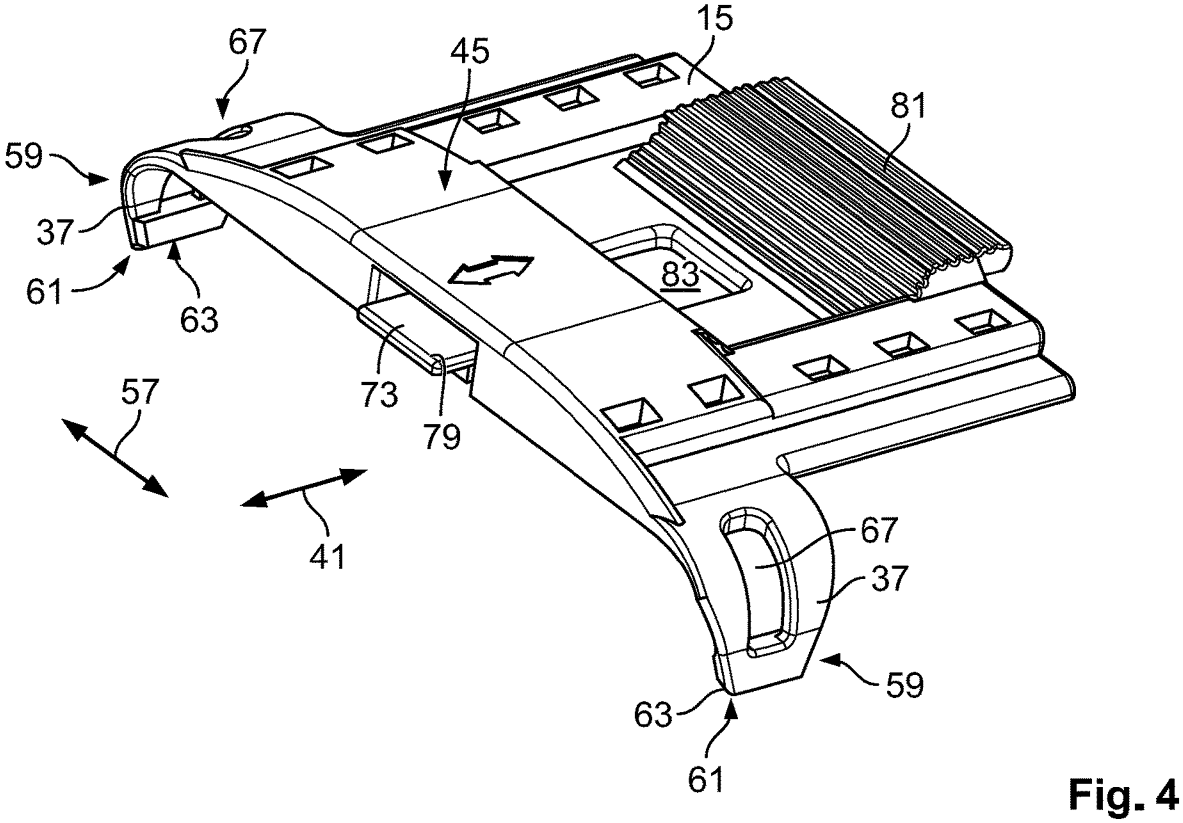
FIG. 4 is a top perspective view of a position assurance element of the plug device of FIG. 1.
Figure 5:
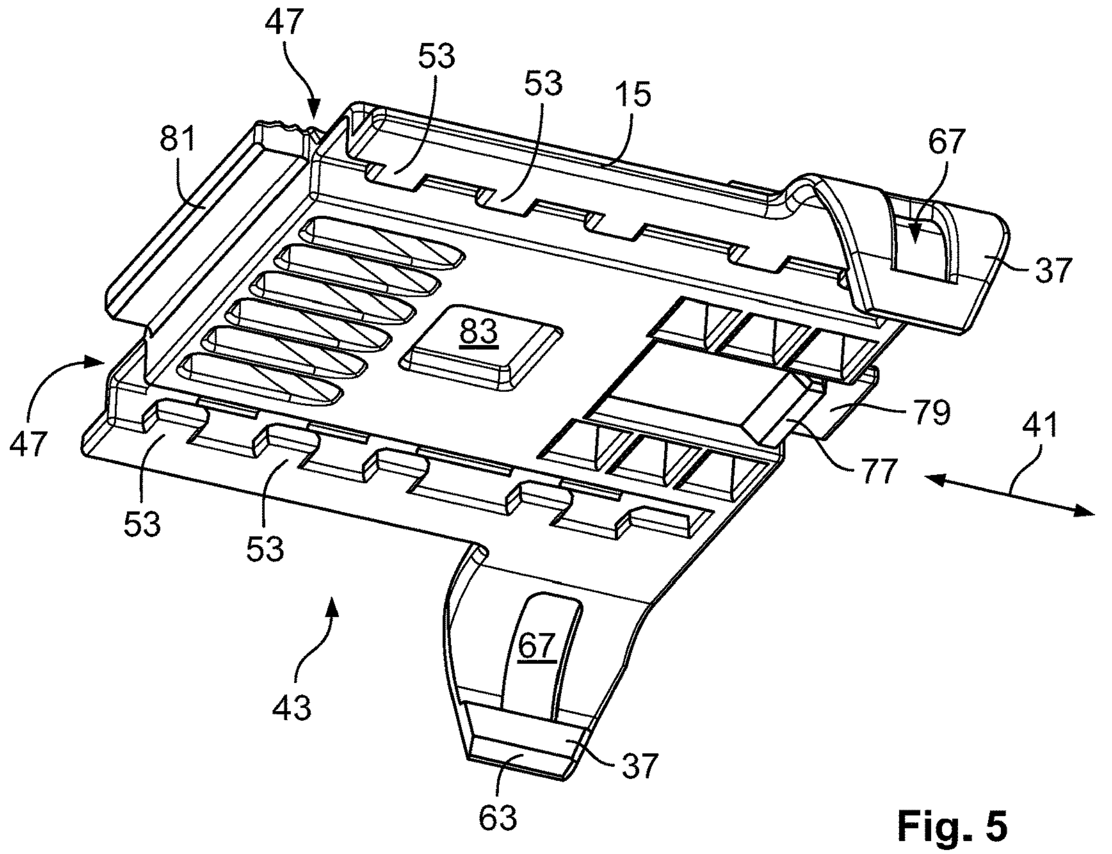
FIG. 5 is a bottom perspective view of the position assurance element of FIG. 4.

To block position assurance element 15 in open position 31, a blocking mechanism 35 is provided by way of which position assurance element 15 is blocked in open position 31 and which comprises at least one release element 37, shown in FIGS. 4 and 5, with which blocking mechanism 35, in a state 39 of connector housing 11 and mating housing 19 being plugged together, is released. When blocking mechanism 35 is released, position assurance element 15 can be moved from open position 31 to securing position 33. In an embodiment, the release element 37 is monolithically formed in a single piece with a remainder of the position assurance element 15. The blocking mechanism 36, in an embodiment, is configured such that the position assurance element 15 in the open position 31 is locked to an outside of the connector housing 11.

Position assurance element 15 of the first embodiment of electrical plug device 1 shall be described in more detail hereafter, in particular with reference to FIGS. 4 and 5. Position assurance element 15 is held to be displaceable at connector housing 11 or outer side 29 of connector housing 11, respectively, along a direction of displacement 41 which in the embodiment shown by way of example runs parallel to lead direction 9 and perpendicular to plugging direction 7.

By being held on outer side 29, interior space 17 of connector housing 11 can be configured independently of position assurance element 15. In particular, position assurance element 15 does not penetrate into interior space 17, as shown in FIG. 7. This makes it easier to implement a sealed connector housing 11, as the connector housing 11 can be configured without openings. The interior space 17 of the connector housing 11 is sealed to the exterior with the exception of a connector face. The connector housing 11, in various embodiment, may have cable bushings or the like, which, however, can be closed by one or more cables and/or corresponding seals.

In order to configure an interior space 17 of the connector housing 11 independently of the position assurance element 15 and in particular to obtain an interior space 17 that is closed off from the exterior, the position assurance element 15 does not project into the interior space 17. In an embodiment, also no part of the connection aid 13 projects into the interior space 17.

For displaceable guidance, the position assurance element 15 comprises two guide structures 47 on an underside 43, as shown in FIG. 5, which when attached to connector housing 11 is closer to connector housing 11 than an upper side 45. The guide structures 47 are complementary to guide structures 49 on connector housing 11, shown in FIG. 2. Guide structures 49 on connector housing 11 comprise grooves 51 which run parallel to direction of displacement 41 and are open to sides facing away from one another. Guide structures 47 on position assurance element 15 are provided with guide elements 53 which can engage in grooves 51. For connecting position assurance element 15 to connector housing 11, guide structures 49 on connector housing 11 comprise recesses 55 with which guide elements 53 can be guided transverse to direction of displacement 41 in order to connect two guide structures 47 of position assurance element 15 to two guide structures 49 of connector housing 11. The guide structures 47, 49 can form a rail-like guide.

Position assurance element 15 comprises two release elements 37 which are disposed opposite one another along a transverse direction 57 of connector housing 11, as shown in FIG. 4. Transverse direction 57 runs transverse to plugging direction 7 and transverse to lead direction 9 or to direction of displacement 41, respectively. Two release elements 37 of the first embodiment of plug device 1 are formed as wings 59 which extend from the remainder of position assurance element 15 first a little along transverse direction 57 and thereafter in the direction toward connector housing 11. Wings 59 abut against outer side 29 and engage around connector housing 11 at least in sections, as shown in FIG. 1. The release element 37 can have a flat configuration.

Arranged at oppositely disposed ends 61 of wings 59 are respective chamfered sections 63, shown in FIGS. 4 and 5, which facilitate the penetration of a section of mating housing 19 between release elements 37 and connector housing 11. In other words, each wing 59 opens a gap 65 between itself and connector housing 11, shown in FIG. 7, in order to facilitate the insertion of a section of mating housing 19 between wing 59 and connector housing 11.

Release elements 37 configured as wings 59 can be resiliently deflected away from connector housing 11. As a result of the resilient deflection, the release element 37 can return to its original position when it is not deflected from the mating housing. Each release element 37 is provided with an opening 67 which is shown as a passage opening 67 by way of example only. Instead of a passage opening 67, opening 67 can also be formed as a recess or indentation extending from underside 43 into respective wing 59.

Figure 2:
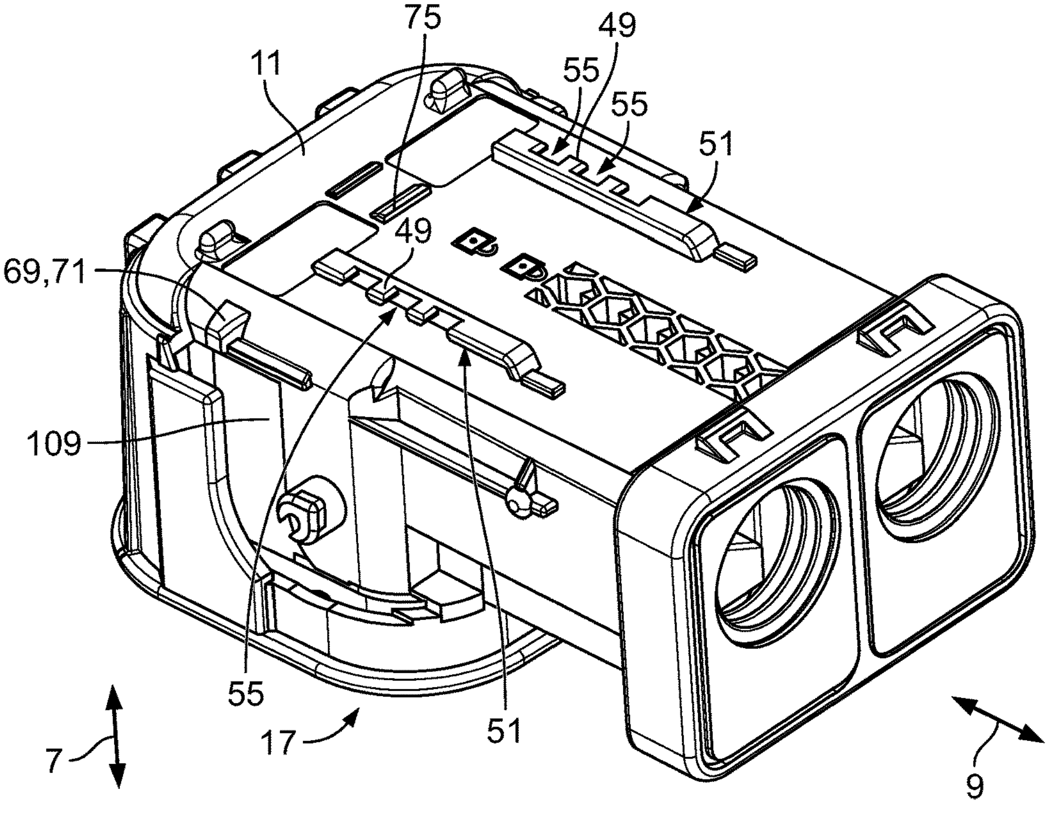
FIG. 2 is a perspective view of a connector housing of the electrical plug device of FIG. 1.

Connector housing 11 is provided with locking elements 69, shown in FIGS. 1 and 2, which in open position 31 of position assurance element 15 project into openings 67 in order to hold position assurance element 15 in a positive-fit manner at least in direction of displacement 41. Locking elements 69 are configured as projections 71 which project outwardly from outer side 29. According to an alternative embodiment, which is not shown, connector housing 11 could also be provided with indentations or openings into which projections of release elements 37 project in open position 31. Alternatively, the release element 37 can comprise a projection and the locking element 69 can comprise a receptacle. The locking element 69 and the release element 37 can also have other suitable shapes, for example, catch tabs, catch noses or the like.

Locking elements 69 and release elements 37 are both parts of blocking mechanism 35.

In order to hold position assurance element 15 also in securing position 33, assurance element 15 comprises a catch element 73, shown in FIG. 11, which is resiliently deflectable away from the housing and which is configured for a positive-fit connection to a mating catch element 75 on connector housing 11. Mating catch element 75 defines a catch receptacle 76 in which catch tab 77 can be arranged and is then in engagement with mating catch element 75. Alternatively, a reverse configuration is also possible.

Catch element 73 comprises a catch tab 77 projecting on underside 43 of position assurance element 15 and a resiliently deflectable arm 79 on which catch tab 77 is arranged, as shown in FIG. 5. Resiliently deflectable arm 79 is accessible from the outside so that it can be raised manually with a tool or a finger if the intention is to release position assurance element 15 from securing position 33.

Resiliently deflectable arm 79 extends along direction of displacement 41 and is resiliently deflectable substantially along plugging direction 7. Resiliently deflectable arm 79 is, in an embodiment, arranged centrally on position assurance element 15 along transverse direction 57. The resiliently deflectable arm is arranged in direction of displacement 41 on the side of position assurance element 15 on which wings 59 are also disposed. On a side which in direction of displacement 41 is disposed oppositely, position assurance element 15 is provided with a projection 81 shown in FIG. 5 which, in securing position 33, can be arranged at least a little way above connection aid 13 in order to hold the latter in holding position 27.

Position assurance element 15 is provided with a viewing window 83, shown in FIG. 4, through which a view onto outer side 29 of housing 11 is possible, as shown in FIG. 11. Pictograms or information represented in a different manner can then be visible on housing 11, where position assurance element 15 is able to make visible through window 83 a different pictogram that depends on position 31 or 33. It can thus be indicated, for example, in which position 31 or 33 position assurance element 15 is disposed.

Connection aid 13 shall be briefly discussed hereafter. Reference is presently made in particular to FIG. 3. Connection aid 13 is configured as a lever 23 which is mounted to be rotatable at connector housing 11 and is blocked in the securing position 33 by the position assurance element 15, for example in a positive fit. The rotatable mounting can be effected in that the connector housing 11 is provided with two projections 85, shown in FIG. 1, that are disposed opposite one another in transverse direction 57 and point away from the remainder of housing 11 and that project through passage openings 87 in connection aid 13. Connection aid 13 is consequently mounted at two oppositely disposed sides of connector housing 11.

Figure 3:
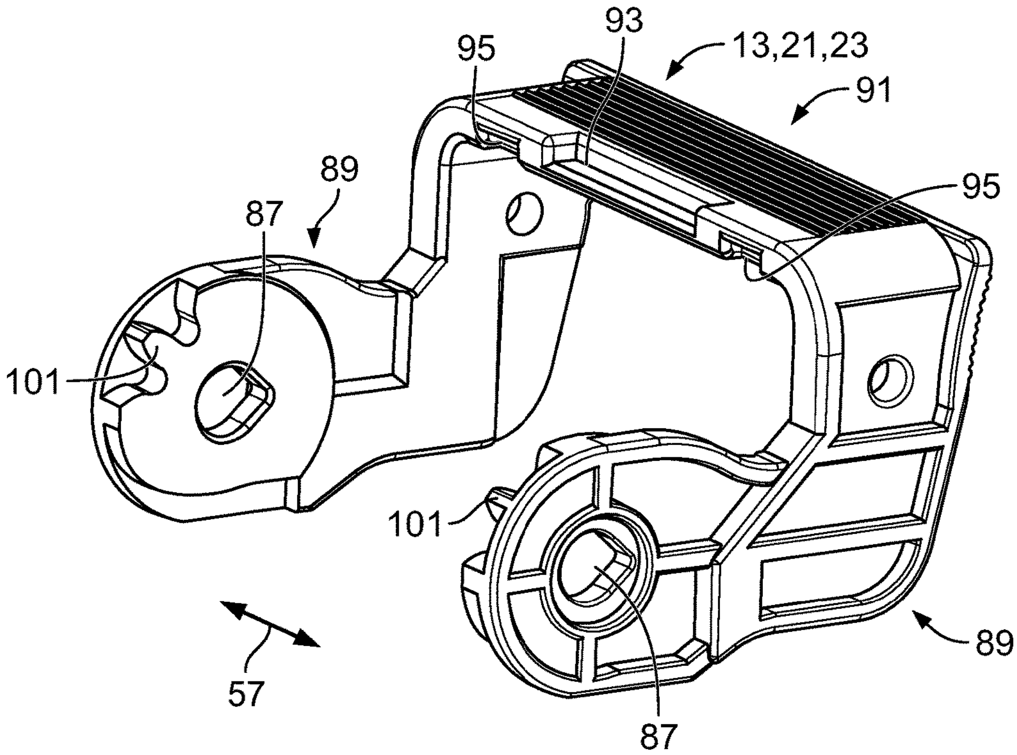
FIG. 3 is a perspective view of a connection aid of the electrical plug device of FIG. 1.

Connection aid 13 therefore comprises two arms 89, shown in FIG. 3, which are spaced from one another in transverse direction 57 and which are connected by way of an actuating web 91 extending parallel to transverse direction 57. Connector housing 11 is there arranged between two arms 89. Provided on actuating web 91 is a recess 93 in which projection 81 of position assurance element 15 can be arranged in securing position 33 in order to hold connection aid 13 at connector housing 11 and to prevent it from moving out of securing position 33.

As shown in FIG. 3, in order to fixate connection aid 13 also in the plugging position, connection aid 13 comprises two recesses 95 on actuating web 91 which are arranged such that recess 93 for projection 81 of position assurance element 15 is arranged, at least in transverse direction 57, between recesses 95. Recess 93 is there open upwardly in order to receive projection 81, recesses 95 are open towards connector housing 11.

In plugging position 25, which is indicated in FIG. 1, projections 97, which are arranged on an upper side 99 of connector housing 11, project into recesses 95 so that connection aid 13 cannot move freely. In order to move connection aid 13 from the plugging position to the holding position, a force must first be exerted on actuating web 91.

To facilitate plugging connector housing 11 and mating housing 19 together, connection aid 13 on each of its arms 89 comprises a tooth 101 (shown in FIG. 3) which can be made to engage with a complementary tooth 103 (shown in FIG. 8) to draw mating housing 19 into connector housing 11 upon actuation of connection aid 13 and to hold it thereon in the holding position.

Figure 9:
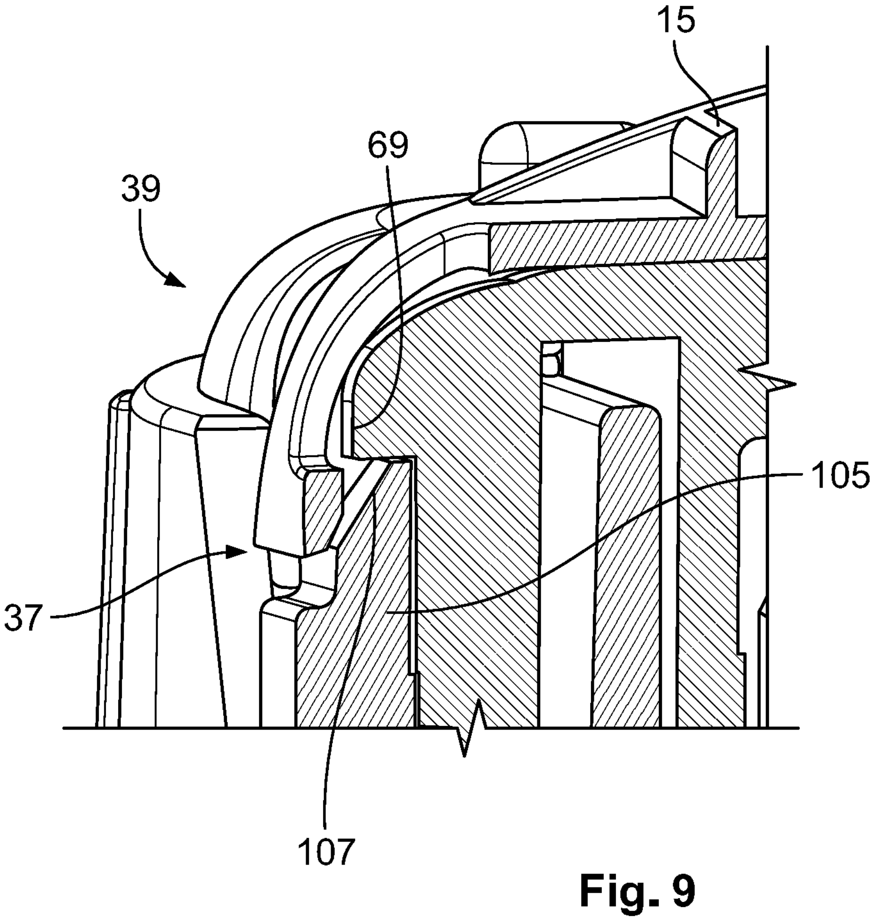
FIG. 9 is a sectional perspective view of the electrical plug device in the state of FIG. 8.

Mating housing 19 is provided with two continuations 105, shown in FIG. 1, which project from the remainder of mating housing 19 in plugging direction 7. Continuations 105 are each part of trigger elements 106 of mating housing 19. Each continuation 105 is used to release one of release elements 37. Each extension 105 has a chamfered surface 107, as shown in FIG. 9, in order to facilitate the insertion into gap 65 between release element 37 and connector housing 11.

As shown in FIG. 7, by being pushed into gap 65, each release element 37 is released from locking element 69, so that position assurance element 15 is no longer blocked in open position 31. Continuations 105 extend farther away from mating housing 19 along plugging direction 7 than teeth 103. Continuations 105 abut against lateral surfaces 109 of connector housing 11 and can slide therealong when connector housing 11 and mating housing 19 are plugged together.

The process of plugging connector housing 11 and mating housing 19 together shall be described briefly hereafter with reference to FIGS. 6 to 11.

Figure 6:
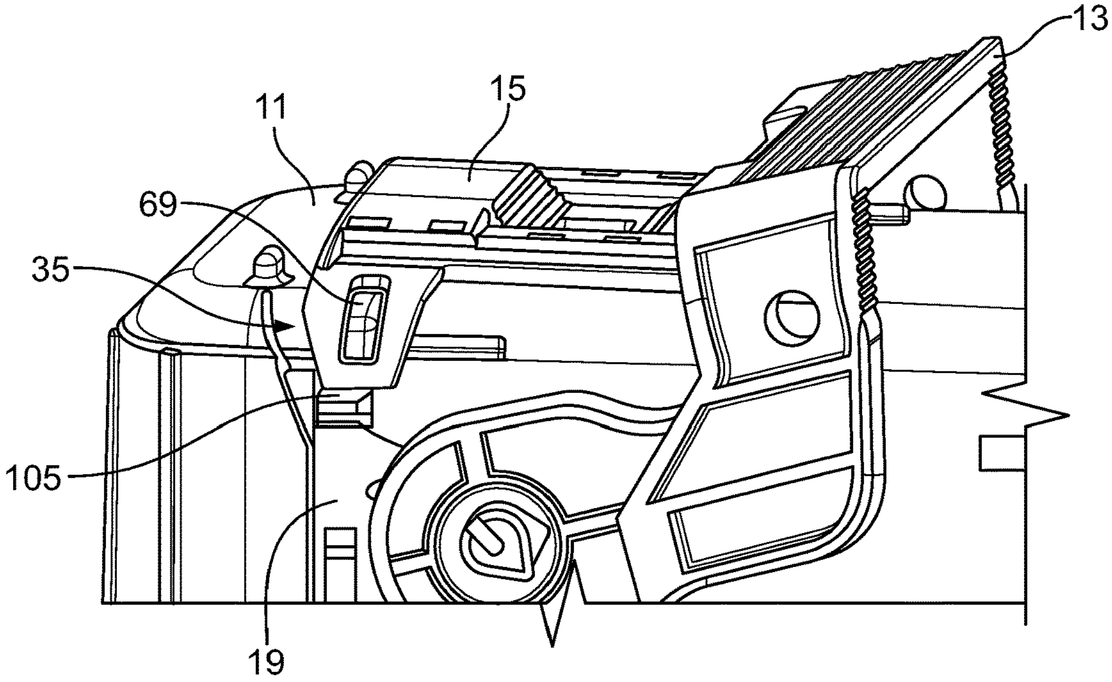
FIG. 6 is a perspective view of the electrical plug device in a first step of plugging a connector housing and a mating housing together.

FIGS. 6 and 7 show a state in which connector housing 11 and mating housing 19 are already connected to one another by the actuation of connection aid 13 to such an extent that continuations 105 of mating housing 19 abut against ends 61 of wings 59. Wings 59 have not yet been raised at this point in time, and blocking mechanism 35 has therefore not yet been released. Any motion of position assurance element 15 is prevented.

Figure 8:
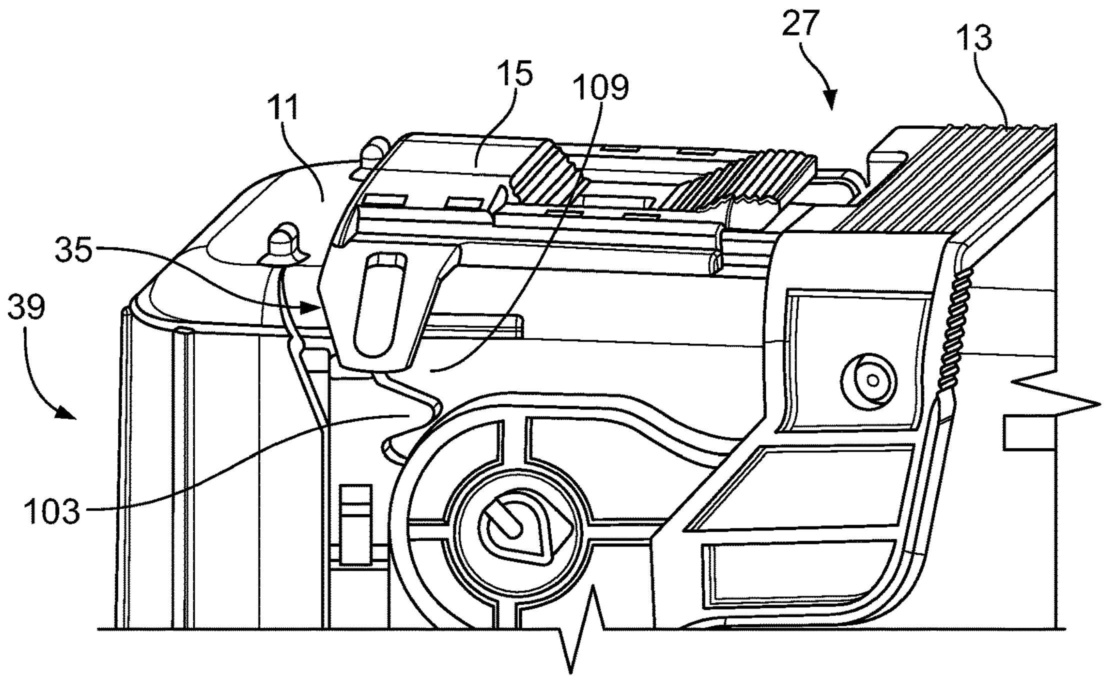
FIG. 8 is a perspective view of the electrical plug device in a next step of plugging the connector housing and the mating housing together, in which a blocking mechanism is released.

By further actuating connection aid 13 in direction of holding position 27, mating housing 19 is moved farther in plugging direction 7 and continuations 105 move into two gaps 65. As a result, two wings 59 are raised and blocking mechanism 35 is released in that locking elements 69 are no longer in engagement with wings 59. This is shown in FIGS. 8 and 9.

Position assurance element 15 can then be moved along direction of displacement 41 to securing position 33, shown in FIGS. 10 and 11. In securing position 33, projection 81 is arranged in recess 93 of the connection aid and is therefore arranged along plugging direction 7 above a section of connection aid 13. Connection aid 13 can now no longer be moved out of holding position 27. Since catch element 73 is in engagement with mating catch element 75 in this position, position assurance element 15 can no longer be moved out of securing position 33 as long as this engagement is not released by raising resiliently deflectable arm 79.

Due to the fact that position assurance element 15 can only be moved from open position 31 to securing position 33 when mating housing 19 is completely plugged together with connector housing 11, it can be prevented that connection aid 13 is moved to holding position 27 and that position assurance element 15 to securing position 33 without a completed plug connection.

In state 39 when plugged together, a common interior space enclosed by housings 11 and 19 is, in an embodiment, sealed off from the exterior. In particular, at least one sealing element can be disposed between two housings 11 and 19.

A second embodiment of an assembly 3 according to the invention with a plug device 1 according to the invention shall be described hereafter with reference to FIGS. 12 to 19. For the sake of brevity, only the differences to the first embodiment described with reference to FIGS. 1 to 11 shall be discussed. Assembly 3 and also plug device 1 of the second embodiment are configured for a 180° plug connection. This means that plugging direction 7 in this case is parallel to lead direction 9. Direction of displacement 41 of position assurance element 15 is also parallel to directions 7 and 9.

Figure 13:
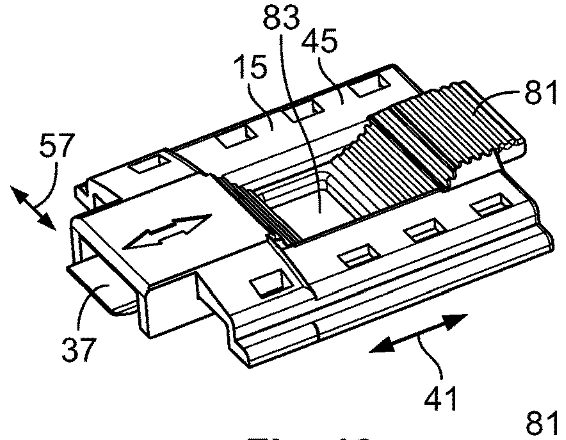
FIG. 13 is a top perspective view of a position assurance element of the electrical plug device of FIG. 12.
Figure 14:
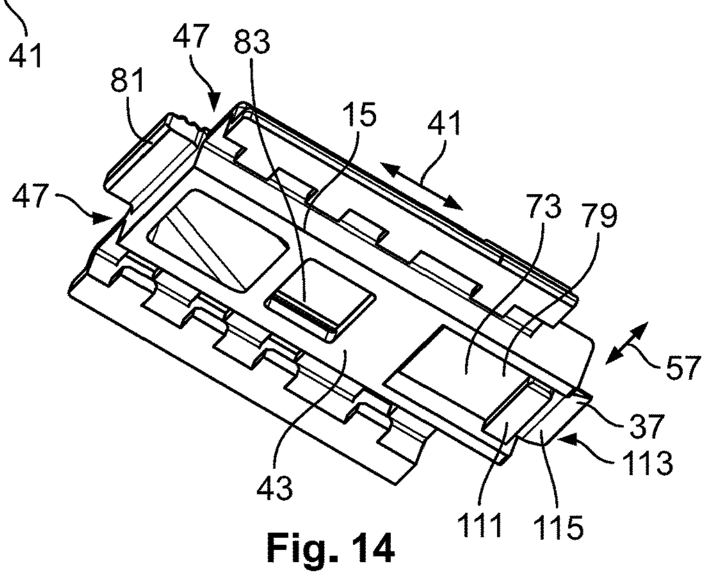
FIG. 14 is a bottom perspective view of the position assurance element of FIG. 13.
Figure 15:
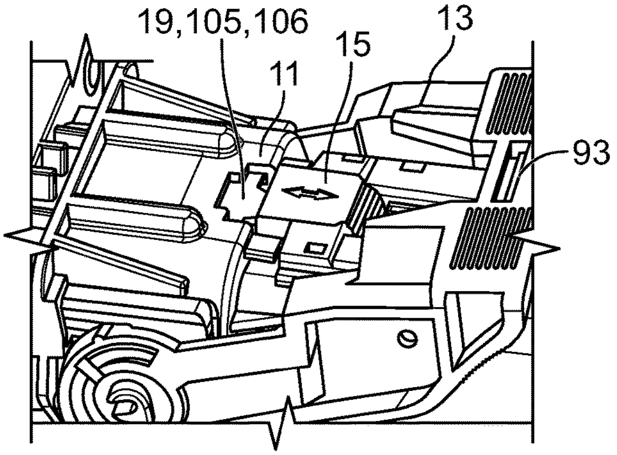
FIG. 15 is a perspective view of the electrical plug device of FIG. 12 in a first step of plugging.

Due to this orientation, which differs from the first embodiment, blocking mechanism 35 is also configured differently than in the previous embodiment. Position assurance element 15, as shown in FIGS. 13 and 14, comprises no lateral wings 59 as release elements 37. Instead, position assurance element 15 is provided with a catch element 73 which comprises a resiliently deflectable arm 79 like in the first embodiment and which is provided with a catch projection 111 that is not chamfered on one side like catch tab 77 of the first embodiment, but has a rectangular cross-section when seen in transverse direction 57. In addition, free end 113 of resiliently deflectable arm 37 is provided with a leading chamfer 115 which is located on underside 43 of position assurance element 15. Free end 113 with leading chamfer 115 serves as a release element 37.

Figure 16:
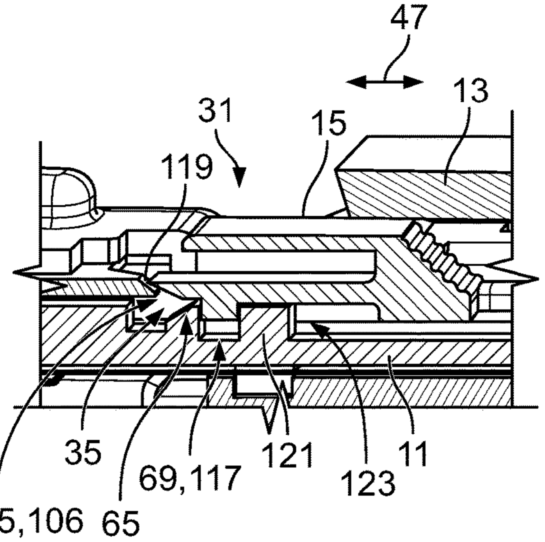
FIG. 16 is a sectional side view of the electrical plug device of FIG. 12 in an open position.

A catch receptacle 117, configured as a recess with a rectangular cross section is provided as locking element 69 at connector housing 11, in which catch projection 111 can be held in open position 31 in a positive-fit manner in direction of displacement 41. This prevents position assurance element 15 from being displaced in open position 31 as long as blocking mechanism 35 has not been not released. This is illustrated in FIG. 16.

When connector housing 11 and mating housing 19 are plugged together, a trigger element 106, in width direction 57 arranged in the middle of mating housing 19, is inserted into gap 65 between release element 37, i.e. free end 113, and the remainder of connector housing 11.

Figure 17:
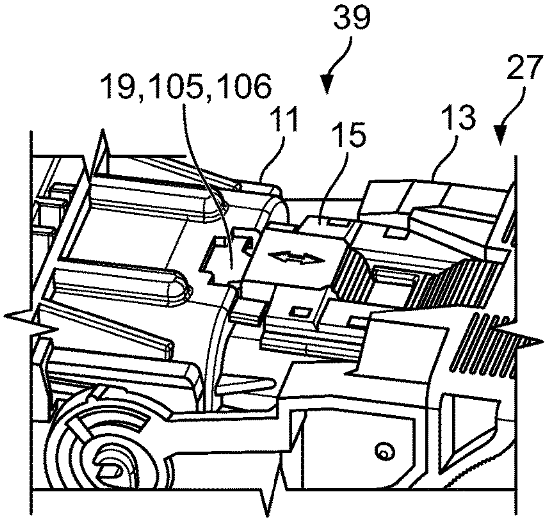
FIG. 17 is a perspective view of the electrical plug device of FIG. 12 in a state of being plugged together.
Figure 18:
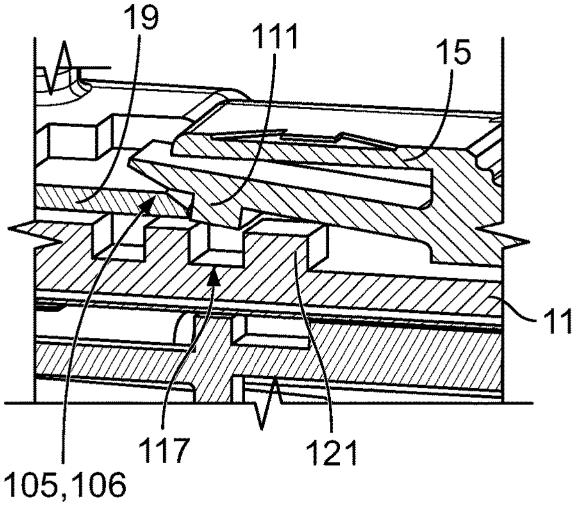
FIG. 18 is a sectional perspective view of the electrical plug device of FIG. 12 in a state in which a projection is moved out of a catch receptacle.
Figure 19:
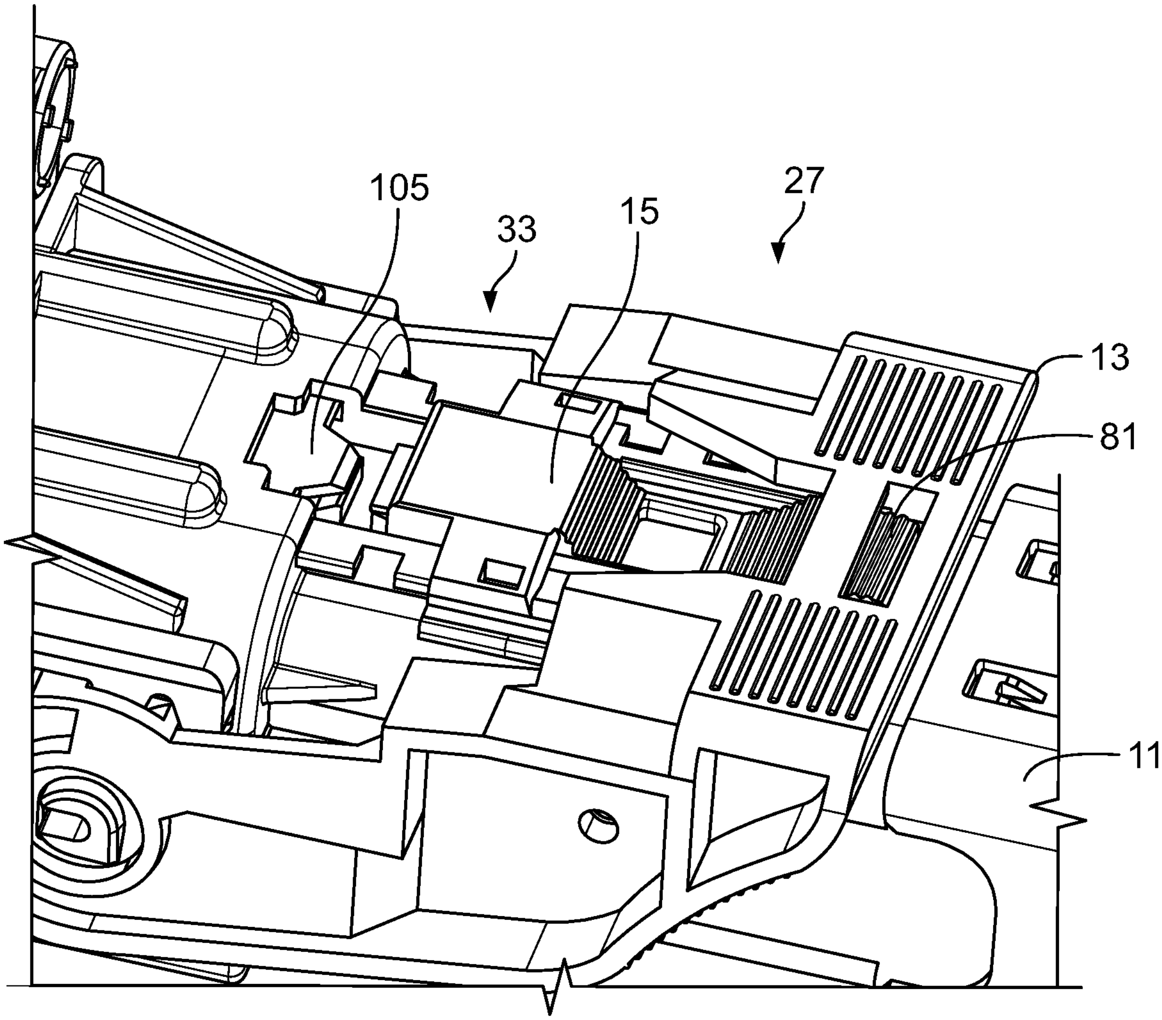
FIG. 19 is a perspective view of the electrical plug device of FIG. 12 in a securing position.

Trigger element 106 provided as continuation 105 with a leading chamfer 119, wherein leading chamfer 119 is complementary to leading chamfer 115, raises resiliently deflectable arm 79 during the plugging process, i.e., away from connector housing 11. As a result, catch projection 111 is raised out of catch receptacle 117. This is illustrated in FIGS. 17 and 18. In state 39 being completely plugged together, when also connection aid 13 has reached holding position 27, catch projection 111 is moved out of catch receptacle 117 to such an extent that blocking mechanism 35 is released and position assurance element 15 can be moved from the open position to the securing position.

In securing position 33, projection 81 of the position assurance element is arranged on part of connection aid 13 so that it can no longer be moved out of holding position 27. Connection aid 13 configured as a lever 23 can comprise a recess 93, shown in FIG. 15, for this purpose also in the second embodiment in which projection 81 can be received in securing position 33.

Catch projection 111 strikes against a mating projection 121 in order to hold position assurance element 15 in securing position 33. Mating projection 121 can have a rectangular cross section and also define catch receptacle 117 in direction of displacement 41, as shown in FIG. 16. In other words, mating projection 121 with its two sides disposed in direction of displacement 41 can define two different receptacles or recesses 117 and 123 which respectively correspond to two positions 31 and 33 of position assurance element 15.

The electrical plug device 1 can be used for a 90° plug connection, for a 180° plug connection, or for plug connections in which a different angle is formed between the electrical conductors to be connected. In the case of a 180° plug connection, a plugging direction along which the connector housing 11 can be plugged to the mating housing 19, may be parallel to a direction of displacement of the position assurance element 13. In the case of a 90° plug connection, the plugging direction may be transverse to the direction of displacement.

What is claimed is:

1. An electrical plug device, comprising:

a connector housing configured to be plugged together in a plugging motion with a mating housing of a mating connector complementary to the connector housing;

a connection aid engageable with the mating housing and forming a drive device for the plugging motion, the connection aid is movable at the connector housing from a plugging position to a holding position, the connector housing in the plugging position is connectable to the mating housing, the mating housing in the holding position is held at the connector housing;

a position assurance element held at an outer side of the connector housing and displaceable from an open position to a securing position, the connection aid in the open position of the position assurance element is movable from the plugging position to the holding position and in the securing position of the position assurance element is fixated in the holding position at the connector housing; and a blocking mechanism blocking the position assurance element in the open position and having a release element with which the blocking mechanism is released in a state of the connector housing and the mating housing being plugged together, the release element is resiliently deflectable away from the connector housing to release the blocking mechanism.

2. The electrical plug device of claim 1, wherein the connector housing has an interior space that is open for connecting to the mating housing and is otherwise closed to an exterior.

3. The electrical plug device of claim 1, wherein the position assurance element does not project into an interior space of the connector housing.

4. The electrical plug device of claim 1, wherein the connector housing has a guide structure on an outer side of the connector housing.

5. The electrical plug device of claim 4, wherein the guide structure displaceably guides and holds the position assurance element.

6. The electrical plug device of claim 1, wherein a gap extends between the release element and the connector housing in the open position.

7. The electrical plug device of claim 6, wherein the blocking mechanism is released by engagement of the mating housing in the gap.

8. The electrical plug device of claim 1, wherein the blocking mechanism has a locking element arranged on an outer side of the connector housing.

9. The electrical plug device of claim 8, wherein the locking element holds the release element in the open position of the position assurance element in a positive-fit manner.

10. The electrical plug device of claim 1, wherein the position assurance element has a wing projecting from the position assurance element transverse to a direction of displacement of the position assurance element.

11. The electrical plug device of claim 10, wherein the wing has the release element.

12. The electrical plug device of claim 1, wherein the position assurance element has a catch element forming a positive-fit connection with a mating catch element at the connector housing to hold the position assurance element in the securing position.

13. The electrical plug device of claim 12, wherein the catch element has a catch tab arranged on a resiliently deflectable arm.

14. The electrical plug device of claim 13, wherein the mating catch element has a catch receptacle for the catch tab.

15. The electrical plug device of claim 12, wherein the catch element is part of the release element.

16. The electrical plug device of claim 1, wherein the connection aid has a lever mounted to be rotatable on an outer side of the connector housing and blocked in the securing position by the position assurance element.

17. An assembly, comprising:

an electrical plug device including a connector housing, a connection aid forming a drive device for the plugging motion, the connection aid is movable at the connector housing from a plugging position to a holding position, a position assurance element held at an outer side of the connector housing and displaceable from an open position to a securing position, the connection aid in the open position of the position assurance element is movable from the plugging position to the holding position and in the securing position of the position assurance element is fixated in the holding position at the connector housing, and a blocking mechanism blocking the position assurance element in the open position and a release element; and a mating connector including a mating housing configured to be plugged together in a plugging motion with the connector housing complementary to the mating housing, the mating housing having a trigger element with which the blocking mechanism is released when the connector housing and the mating housing are in a state being completely plugged together and the position assurance element can be displaced from the open position to the securing position.

18. The assembly of claim 17, wherein the trigger element is a continuation extending in a plugging direction of the mating housing and engages beneath the release element when the connector housing and the mating housing are in the state being completely plugged together.

19. The assembly of claim 17, wherein the connector housing and the mating housing enter into a sealed connection when the connector housing and the mating housing are in the state being completely plugged together.

20. An electrical plug device, comprising:

a connector housing configured to be plugged together in a plugging motion with a mating housing of a mating connector complementary to the connector housing;

a connection aid engageable with the mating housing and forming a drive device for the plugging motion, the connection aid is movable at the connector housing from a plugging position to a holding position, the connector housing in the plugging position is connectable to the mating housing, the mating housing in the holding position is held at the connector housing;

a position assurance element held at an outer side of the connector housing and displaceable from an open position to a securing position, the connection aid in the open position of the position assurance element is movable from the plugging position to the holding position and in the securing position of the position assurance element is fixated in the holding position at the connector housing; and a blocking mechanism blocking the position assurance element in the open position and having a release element with which the blocking mechanism is released in a state of the connector housing and the mating housing being plugged together, a gap extends between the release element and the connector housing in the open position, the blocking mechanism is released by engagement of the mating housing in the gap.

* * * * *